US008636219B2

(12) United States Patent
Sasaki et al.

(10) Patent No.: US 8,636,219 B2
(45) Date of Patent: Jan. 28, 2014

(54) READING APPARATUS, READING SYSTEM AND READING METHOD

(75) Inventors: Yuta Sasaki, Shizuoka-ken (JP); Hidehiro Naito, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/571,568

(22) Filed: Aug. 10, 2012

(65) Prior Publication Data

US 2013/0048735 A1 Feb. 28, 2013

(30) Foreign Application Priority Data

Aug. 26, 2011 (JP) ................................ 2011-185161

(51) Int. Cl.
*G06K 7/10* (2006.01)

(52) U.S. Cl.
USPC ................................ 235/462.41; 235/472.01

(58) Field of Classification Search
USPC ............ 235/462, 383, 462.01, 385, 437, 440, 235/462.41, 472.01
See application file for complete search history.

(56) References Cited

U.S. PATENT DOCUMENTS

| | | | | |
|---|---|---|---|---|
| 6,520,413 | B2 * | 2/2003 | Watanabe et al. | 235/462.15 |
| 7,424,976 | B2 * | 9/2008 | Muramatsu | 235/462.25 |
| 8,215,541 | B2 * | 7/2012 | Bucher et al. | 235/375 |
| 2007/0290043 | A1 * | 12/2007 | Russell et al. | 235/462.14 |
| 2008/0023551 | A1 * | 1/2008 | Boehm et al. | 235/462.32 |
| 2010/0057573 | A1 * | 3/2010 | Singhal | 705/14.64 |
| 2010/0268646 | A1 * | 10/2010 | Erickson | 705/44 |
| 2011/0087529 | A1 * | 4/2011 | Angell | 705/14.13 |
| 2012/0310715 | A1 * | 12/2012 | Singhal | 705/14.1 |
| 2013/0015242 | A1 * | 1/2013 | White | 235/383 |

FOREIGN PATENT DOCUMENTS

| | | |
|---|---|---|
| JP | 2005-205943 | 8/2005 |
| JP | 2008-217046 | 9/2008 |
| JP | 2009-129266 | 6/2009 |

OTHER PUBLICATIONS

Japanese Office Action for Japanese Patent Application No. 2011-185161 mailed on Jun. 18, 2013.
Japanese Office Action for Japanese Patent Application No. 2011-185161 mailed on Aug. 27, 2013.

* cited by examiner

*Primary Examiner* — Thien M Le
(74) *Attorney, Agent, or Firm* — Turocy & Watson, LLP

(57) ABSTRACT

In accordance with the embodiment, a reading apparatus comprises a photographing device configured to photograph an object to produce the image of the object, a reading section configured to read information from the image output from the photographing device, a detection section configured to detect a portable terminal equipped with a display unit for displaying information read by the reading section from the image output from the photographing device and a control section configured to control the photographing of the photographing device according to a first setting for photographing an object other than the display unit of the portable terminal if the portable terminal is not detected, or the photographing of the photographing device according to a second setting for photographing the display unit if the portable terminal is detected.

8 Claims, 7 Drawing Sheets

F1

| COMMODITY ID | COMMODITY CATEGORY | COMMODITY NAME | UNIT PRICE | COMMODITY IMAGE |
|---|---|---|---|---|
| XXXXXXXX | VEGETABLE | CARROT | 200¢ |  |
| ⋮ | ⋮ | ⋮ | ⋮ | ⋮ |

READING APPARATUS, READING SYSTEM AND READING METHOD

CROSS-REFERENCE TO RELATED APPLICATION

This application is based upon and claims the benefit of priority from Japanese Patent Application No. 2011-185161, filed Aug. 26, 2011, the entire contents of which are incorporated herein by reference.

FIELD

Embodiments described herein relate to a reading apparatus for photographing a computer readable symbol, a reading system and a reading method.

BACKGROUND

Two-dimensional code symbols such as QR code (trademark) have been used widely in recent years. Moreover, a POS terminal using a camera type scanner has appeared on the market as an apparatus for reading information from a two-dimensional code. The POS terminal using a camera type scanner can recognize not only a barcode but also a two-dimensional code such as QR code (trademark) and a discount seal and is therefore capable of automatically performing a discount operation to a commodity subject to the discount when the commodity is purchased by a customer.

DETAILED DESCRIPTION

In accordance with one embodiment, a reading apparatus comprises a photographing device configured to photograph an object to produce the image of the object, a reading section configured to read information from the image output from the photographing device, a detection section configured to detect a portable terminal equipped with a display unit for displaying information read by the reading section from the image output from the photographing device and a control section configured to control the photographing of the photographing device according to a first setting for photographing an object other than the display unit of the portable terminal if the portable terminal is not detected, or the photographing of the photographing device according to a second setting for photographing the display unit if the portable terminal is detected.

Figure 1:
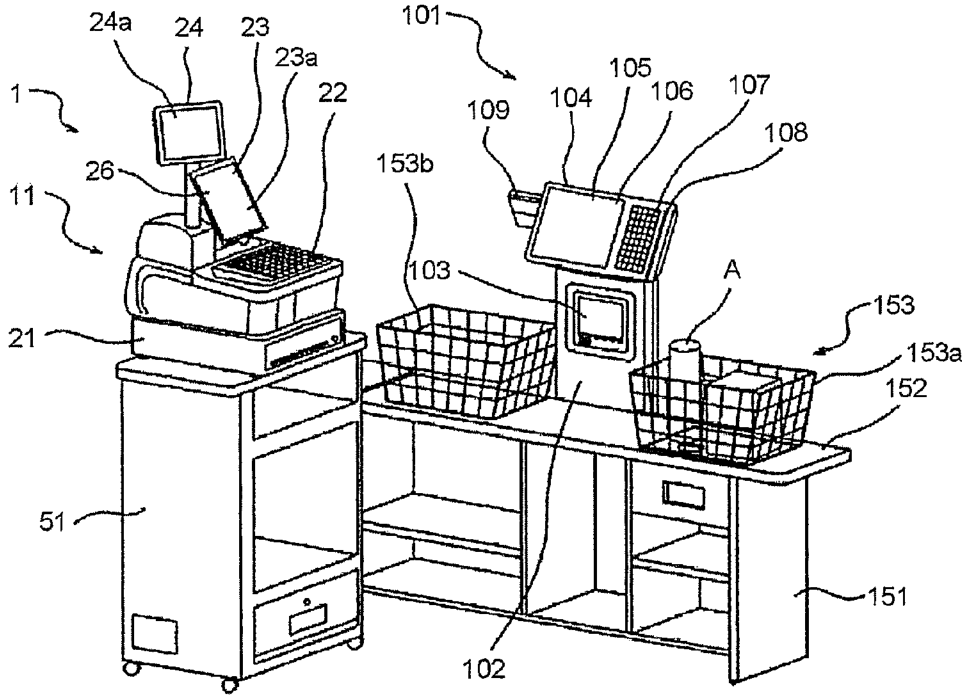
FIG. 1 is a perspective view showing the whole structure of a POS system according to the present embodiment.

A present embodiment is described below with reference to the accompanying drawings. FIG. 1 is a perspective view showing the whole structure of a POS system according to the present embodiment. As shown in FIG. 1, the POS (Point Of Sales) system 1 has a POS terminal 11 which performs the registration and settlement of commodities in one transaction. The POS terminal 11 is placed on the upper surface of a cash drawer 21 on a checkout counter 51. The pos terminal 11 controls the open/close operation of the cash drawer 21. A keyboard 22 that is operated by an operator (user) is arranged on the upper surface of the POS terminal 11. A display 23 for displaying information for operator is arranged at a position more backside than the keyboard 22 from the operator who operates the keyboard 22. The display 23 displays information on the display panel 23*a* thereof. The POS terminal 11 includes a touch panel 26 laminated on the display panel 23*a*. The pos terminal 11 also includes a rotatable display 24 for customer that is vertically arranged at a position more backside than the display 23. The display 24 for customer displays information on the display panel 24*a* thereof. Moreover, the display panel 24*a* of the display 24 shown in FIG. 1 faces the front side in FIG. 1, however, by rotating the display 24, the display panel 24*a* may also face the back side in FIG. 1 to enable the display 24 to show information to a customer.

In the pos system 11, a table-shaped counter 151 having a wide-width is arranged to form an L shape with the checkout counter 51 on which the POS terminal 11 is placed. A placing surface 152 is formed on the upper surface of the counter 151. A shopping basket 153 in which a commodity A is accommodated is placed on the placing surface 152. The shopping basket 153 may be distinguished in use to a first shopping basket 153*a* that a customer takes onto the counter 151 and a second shopping basket 153*b* placed at a position opposite to the first shopping basket 153*a* through a commodity reading apparatus 101. The shopping basket 153 (the first shopping basket 153*a*), which is not limited in shape to an ordinary basket, may also be a tray used in a bakery and the like. The shopping basket 153 (the second shopping basket 153*b*), which is not limited in shape to an ordinary basket, may also be a carton used in a donut shop and the like.

The commodity reading apparatus 101, which is connected with the POS terminal 11 to transmit data with the POS terminal 11, is arranged on the placing surface 152 of the counter 151. The commodity reading apparatus 101 has a rectangular housing 102 having a relatively thin length. A reading window 103 is arranged at the front side of the housing 102. A display/operating section 104 is mounted on the upper portion of the housing 102. A display 106 having a touch panel 105 laminated on the surface thereof is arranged on the display/operating section 104. A keyboard 107 is arranged at the right side of the display 106. The card reading slot 108 of a card reader (not shown) is arranged on the right side of the keyboard 107. A display 109 for providing information for customer is arranged at the left side of and behind the display/operating section 104 at a position at which the operator operates the display/operating section 104.

The commodity reading apparatus 101 comprises a commodity reading section 110 (refer to FIG. 2), in which a photographing section 164 (refer to FIG. 2) and an illumination section 166 (refer to FIG. 2) are arranged behind the reading window 103.

Commodities A to be settled in one transaction are accommodated in the first shopping basket 153*a* held by the customer. The operator manually moves the commodities A into the second shopping basket 153*b* one by one. In the course of the movement, the commodity A faces the reading window 103 of the commodity reading apparatus 101. At this time, the photographing section 164 (refer to FIG. 2) behind the reading window 103 photographs the commodity A. In the commodity reading apparatus 101, the commodity A contained in the image photographed by the photographing section 164 (refer to FIG. 2) is wholly or partially detected. If it is detected that the image photographed by the photographing section 164 (refer to FIG. 2) contains the commodity A wholly or partially, the photographed image is output to the POS terminal 11. In the POS terminal 11, the commodity A is recognized from the whole or partial image of the commodity A photographed by the photographing section 164 (refer to FIG. 2) of the commodity reading section 110 with reference to a PLU file F1 (described in detail below, refer to FIG. 3) in which the sales registration information of the commodity A is associated with the image of the commodity A, thereby specifying the commodity A to be sales-registered. Besides, the POS terminal 11 registers the sales of the commodity A by recording the commodity ID, the commodity category, the commodity name, the unit price and other sales registration information of the specified commodity A in a sales master file (not shown).

Further, a portable terminal P (refer to FIG. 5) equipped with a display unit 501 (refer to FIG. 5) having a liquid crystal screen for displaying a computer readable code symbol (e.g. QR code (trademark), barcode) of the commodity A containing the discount information of the commodity A and a coupon ticket on which the code symbol (e.g. QR code (trademark), barcode) of the commodity A containing the discount information of the commodity A is printed are held to the reading window 103 of the commodity reading apparatus 101. At this time, the photographing section 164 (refer to FIG. 2) arranged behind the reading window 103 photographs the image of the code symbol displayed on the display unit 501 (refer to FIG. 5) or the image of the code symbol printed on a coupon ticket. In the commodity reading apparatus 101, the discount information of the commodity A is read out of the code symbol contained in the image photographed by the photographing section 164 (refer to FIG. 2). Then, the commodity reading apparatus 101 outputs the discount information of the commodity A to the POS terminal 11. After receiving the discount information of the commodity A, the POS terminal 11 adds the discount information of the commodity A to the sales registration information of the commodity A specified by the image photographed by the photographing section 164 and records the modified sales registration information in the sales master file (not shown) to carry out a sales registration processing.

Figure 2:
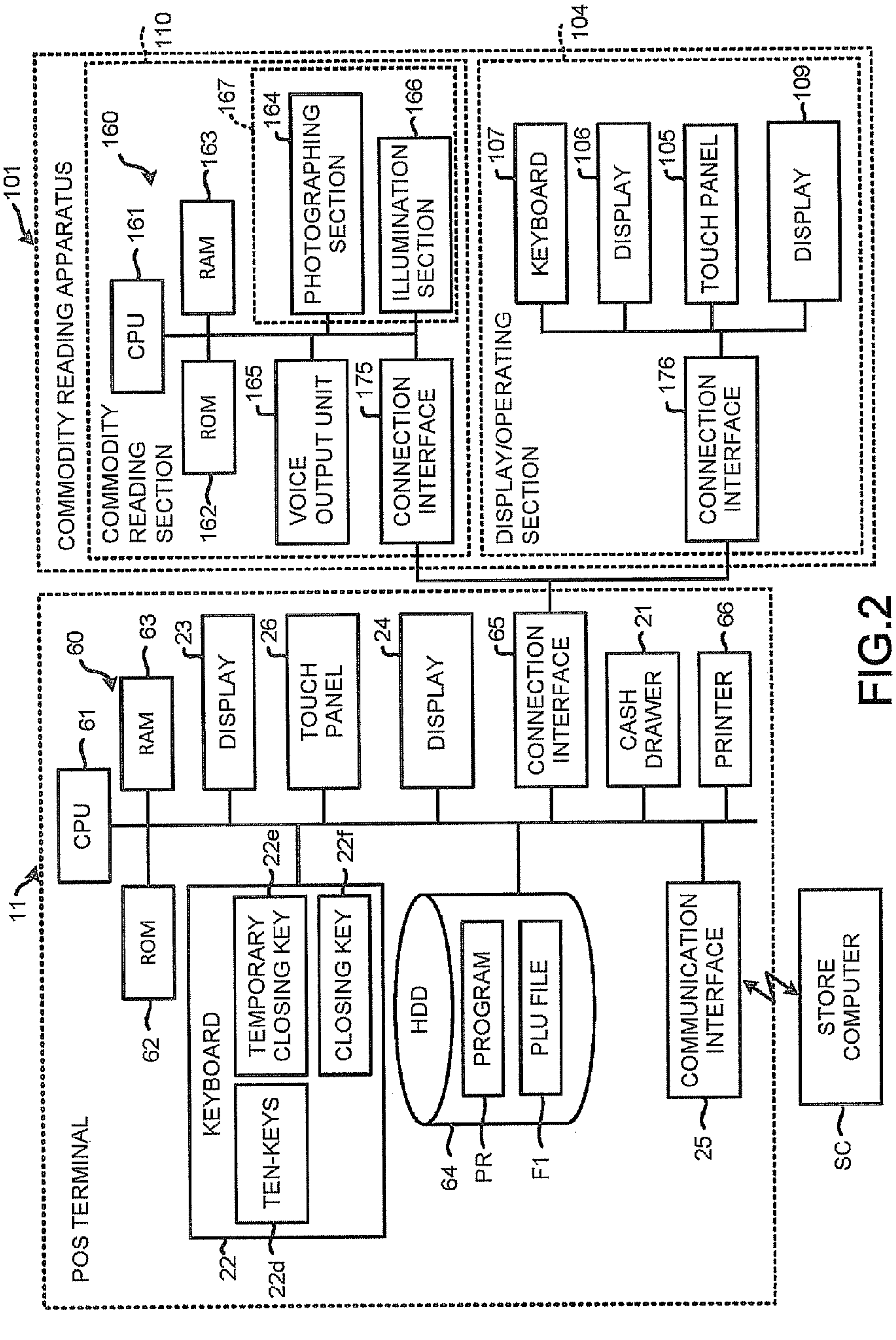
FIG. 2 is a block diagram showing the hardware components of a POS terminal and a commodity reading apparatus.

FIG. 2 is a block diagram showing the hardware components of the POS terminal and the commodity reading apparatus. The POS terminal 11 is provided with a microcomputer 60 which functions as an information processing unit to carry out an information processing. The microcomputer 60 includes a CPU (Central Processing Unit) 61 for carrying out various operations to control each other unit, a ROM (Read Only Memory) 62 and a RAM (Random Access Memory) 63 which are respectively connected to the CPU 61 via a bus line.

The CPU 61 of the POS terminal 11 is connected, via various input/output circuits (not shown), with the cash drawer 21, the keyboard 22, the display 23, the touch panel 26 and the display 24 for customer, each of which is controlled by the CPU 61.

The keyboard 22 includes keypads (ten-keys) 22*d* on the surface of which numerals '1', '2', '3' and operators such as '*' are displayed, a temporary closing key 22*e* and a closing key 22*f*.

The CPU 61 of the POS terminal 11 is connected with an HDD (Hard Disk Drive) 64, in which programs and files are stored. When the POS terminal 11 is activated, the programs and files stored in the HDD 64 are wholly or partially copied to the RAM 63 to be sequentially executed by the CPU 61. An example of the programs stored in the HDD 64 is a commodity sales data processing program PR. An example of the files stored in the HDD 64 is the PLU file F1 which is transmitted from a store computer SC to the POS terminal and then stored in the HDD 64.

Figure 3:
FIG. 3 is a conceptual diagram exemplarily showing the data structure of a PLU file.

The PLU file F1 is a file in which the sales registration information of each of the commodity A sold in a shop is associated with the image of the commodity A. FIG. 3 is a conceptual diagram exemplarily showing the data structure of the PLU file F1. As shown in FIG. 3, the PLU file F1 is a file in which the sales registration information including the commodity ID uniquely assigned, the category, the name and the unit price for each commodity A and the image of each commodity A photographed are stored.

Returning to FIG. 2, the CPU 61 of the POS terminal 11 is connected with a communication interface 25 that is used to perform a data communication with the store computer SC via an input-output circuit (not shown). The store computer SC is installed in the backyard of a shop. The PLU file F1 to be sent to the POS terminal 11 is stored in the HDD (not shown) of the store computer Sc.

In addition, the CPU 61 of the POS terminal 11 is connected with a connection interface 65 which enables a data transmission/reception with the commodity reading apparatus 101. The connection interface 65 is connected with the commodity reading apparatus 101. Moreover, the CPU 61 of the POS terminal 11 is connected with a printer 66 for printing receipts. The POS terminal 66 prints the content of one transaction on a receipt under the control of the CPU 61.

The commodity reading apparatus 101 also has a microcomputer 160. The microcomputer 160 includes a CPU 161 connected with a ROM 162 and a ROM 163 via a bus line. The programs executed by the CPU 161 are stored in the ROM 162. The CPU 161 is connected with a photographing device 167 and a voice output unit 165 via various input/output circuits (not shown). The photographing device 167 and the voice output unit 165 operate under the control of the CPU 161. The display/operating section 104 is connected with the POS terminal 11 via a connection interface 176. The display/operating section 104 operates under the control of the CPU 61 of the POS terminal 11.

The photographing device 167 includes a photographing section 164, for example, a color CCD (Charge Coupled device) image sensor or a color CMOS (Complementary Metal Oxide Semiconductor) image sensor, which photographs an image through the reading window 103 under the control of the CPU 161, and an illumination section 166, for example, an LED (Light Emitting Diode) irradiating light that covers the image photographing area of the photographing section 164.

For instance, the photographing section 164 photographs frame images at a given frame rate (e.g. 1/5000 second). Then, the CPU 161 stores the frame images sequentially photographed at the given frame rate in the RAM 163. Besides, the photographing section 164 may change, by the CPU 161, the frame rate at which frame images are photographed. Further, the illumination section 166 may change the illumination intensity by the CPU 161.

Figure 4:
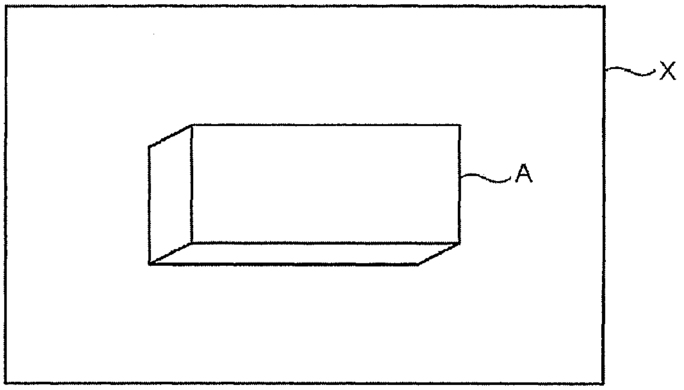
FIG. 4 is a diagram showing the relationship between the photographing area of a photographing section and a commodity to be photographed.
Figure 5:
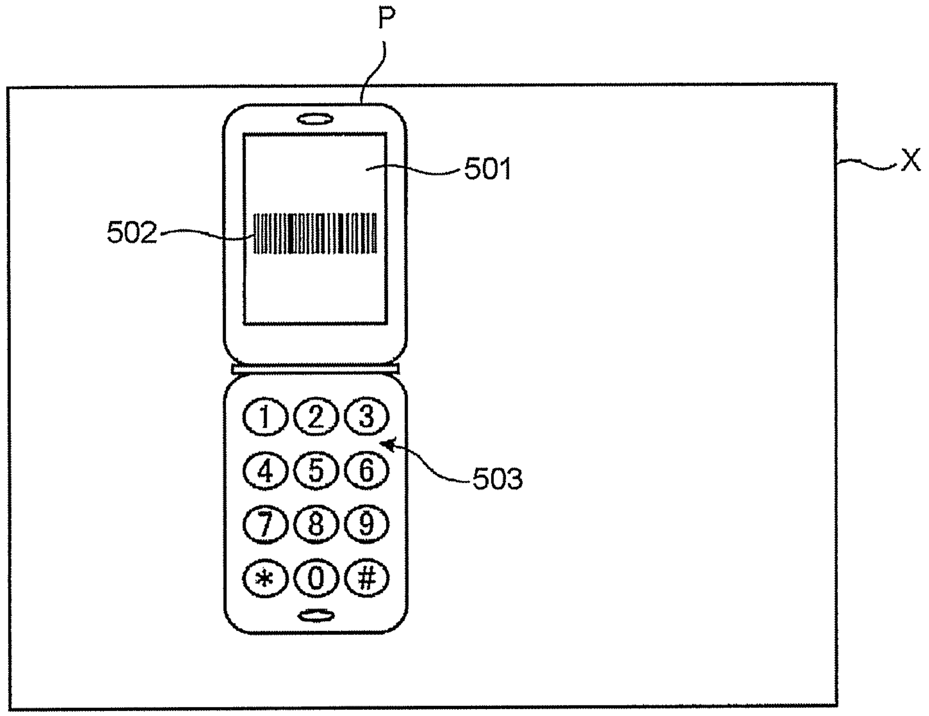
FIG. 5 is a diagram showing the relationship between the photographing area of a photographing section and a portable terminal.

FIG. 4 is a diagram showing the relationship between the photographing area of a photographing section and a commodity. FIG. 5 is a diagram showing the relationship between the photographing area of a photographing section and a portable terminal. As shown in FIG. 4, when the operator manually holds the commodity A in the photographing area X of the photographing section 164, the photographing section 164 photographs an image containing the whole or part of the commodity A. Moreover, as shown in FIG. 5, when the operator manually holds the portable terminal P in the photographing area X of the photographing section 164 before or after the commodity A is photographed, the photographing section 164 photographs an image containing the code symbol, for example, a barcode 502 or QR code (trademark), displayed on the display unit 501 of the portable terminal P and the keyboard 53 (including a keypad consisting of number keys '1'-'9' arranged in the form of a 3×3 array and operator keys such as '#' and '*') of the portable terminal P. Moreover, the barcode 502 displayed on the display unit 501 of the portable terminal P contains the discount information of the commodity A. Moreover, the display unit 501 of the portable terminal P is, for example, a liquid crystal screen that displays images by radiating light.

Returning to FIG. 2, the voice output unit 165 consists of a voice circuit and speaker for radiating a given warning sound. Under the control of the CPU 161, the voice output unit 165 informs events with the warning sound.

Further, the CPU 161 is connected with a connection interface 175 which is connected with the connection interface 65 of the POS terminal 11 to transmit data with the POS terminal 11. The CPU 161 outputs, via the connection interface 175, the image (containing the whole or part of the commodity A) photographed by the photographing section 164 of the commodity reading apparatus 101 and the discount information of the commodity A read from the code symbol displayed on the display 501 of the portable terminal P, and outputs, via the connection interface 65, the image and discount information to the POS terminal 11.

Figure 6:
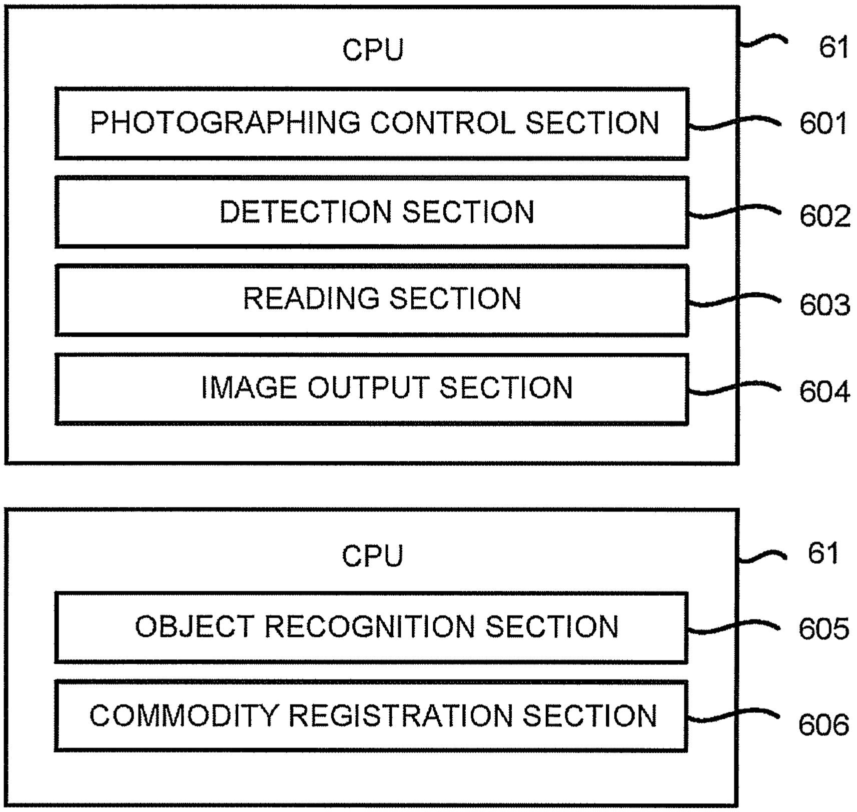
FIG. 6 is a block diagram showing the functional components of a POS terminal and a commodity reading apparatus.

Next, the functional components of the CPU 161 and the CPU 61 achieved by sequentially executing the programs by the CPU 161 and the CPU 61 are described below with reference to FIG. 6. FIG. 6 is a block diagram showing the functional components of the POS terminal 11 and the commodity reading apparatus. As shown in FIG. 6, by executing programs sequentially, the CPU 161 functions as a photographing control section 601, a detection section 602, a reading section 603 and an image output section 604, and in the same way, the CPU 61 functions as an object recognition section 605 and a commodity registration section 606.

The photographing control section 601 outputs a photographing-on signal to the photographing section 164 to start a photographing operation by the photographing section 164. The photographing control section 601 sequentially acquires the frame images that are photographed by the photographing section 164 and stored in the RAM 163 after the photographing operation is started. The photographing control section 601 acquires the frame images in the order of the frame images that are sequentially stored in the RAM 163.

Moreover, while the photographing device 167 photographs frame images, the photographing control section 601 controls the photography of the frame image by the photographing device 167 according to a first setting in which objects other than the display unit 501, such as a coupon ticket on which discount information is printed and the commodity A, are photographed, or a second setting in which the display unit 501 of the portable terminal P is photographed.

In this embodiment, if the display unit 501 is detected by the detection section 602, the photographing control section 601 controls photographing of frame image by the photographing section 164 at a frame rate lower than a preset frame rate (e.g. 1/5000 second) according to the second setting, and turns off the illumination section 166 or reduces the illumination of the illumination section 166 to a value smaller than a given one. Moreover, if the display unit 501 is a liquid crystal screen, the photographing control section 601 may control the frame rate of the photographing section 164 according to the illumination of the light radiated from the backlighting device equipped in the liquid crystal screen.

On the other hand, if the display unit 501 is not detected by the detection section 602, in order to photograph a coupon ticket on which a discount information is printed and, the commodity A, the photographing control section 601 controls the photography of the photographing section 164 at a given frame rate, for example, a shutter speed as high as about 1/5000 second at which image blur can be reduced, according to the first setting, and turns on the illumination section 166 or increases the illumination of the illumination section 166 to a value greater than a given one.

In addition, the photographing control section 601 switches the setting for controlling the photography by the photographing device 167 to the second setting if the portable terminal P is detected by the detection section 602. After switching to the second setting, the photographing control section 601 further switches the setting for controlling the photography of the photographing device 167 to the first setting if the reading section 603 described later reads information.

The detection section 602 detects the whole or part of the commodity A or the portable terminal P contained in the frame image acquired by the photographing control section 601 using a pattern matching technology or character recognition technology.

In this embodiment, the detection section 602 detects whether or not there is a complexion (fresh color) area in the acquired frame image. If a complexion area is detected, that is, the hand of the operator photographed is detected, the detection section 602 extracts an outline from an image that the frame image acquired is binarised. In this way, the detection section 602 attempts to extract the outline of the commodity A or the portable terminal P that is held by the hand of the operator. At this time, if the outline of a hand and another outline are detected, then it can be determined that the operator holds the commodity A or portable terminal P.

Here, the detection section 602 recognizes specific characters, for example, numbers 1-9, from the frame image in the case in which it is determined that the commodity A or the portable terminal P is held by the operator. The detection section 602 further determines whether or not numbers 1-9 are arranged in the form of a 3×3 array. Then, if it is determined that numbers 1-9 are recognized from the frame image and are arranged in the form of a 3×3 array, the detection section 602 determines existence of the keyboard 503 of the portable terminal P and the object held by the operator to be the portable terminal P. On the other hand, if specific characters are not recognized or the recognized characters are not arranged in a given format, the detection section 602 determines that the object held by the operator is the commodity A.

Moreover, in this embodiment, the detection section 602 detects the whole or part of the portable terminal P using a pattern matching technology or character recognition technology, however, the present invention is not limited to this. For instance, by referring to the standard image of the portable terminal P, the detection section 602 may recognize the portable terminal P as a specific object by reading surface states (e.g. color in hue or shade, surface l roughness, etc.) from the frame image photographed by the photographing section as a characteristic amount. Moreover, the detection section 602 takes no consideration of the outline or size of the portable terminal P so as to shorten the processing time. By applying an object recognition to the detection on the whole or part of the portable terminal P, the detection section 602 may detect a portable terminal that is provided with no keyboard 503 and therefore operated with a touch panel. For instance, the detection section 602 may detect a portable terminal by reading the specular reflection of a liquid crystal screen on which a touch panel is laminated from the frame image photographed by the photographing section 164 as a characteristic amount.

The recognition on an object contained in an image is referred to as a generic object recognition, which is realized by various recognition technologies that are respectively illustrated in the following document:

YANAI Keiji, 'The current state and further directions on Generic Object Recognition', in Proceedings of Information Processing Society of Japan, Vol. 48, No SIG 16, In URL: http://mm.cs.uec.ac.jp/IPSJ-TCVIM-Yanai.pdf [retrieved on Aug. 10, 2010].

In addition, the technology for recognizing a generic object through target-aimed regional image segmentation is described in the following document:

Jamie Shotton: "Semantic Texton Forests for Image Categorization and Segmentation, In URL:http://citeseerx.ist.psu.edu/viewdoc/download?doi=10.1.1.145.3036&rep=rep1&type=pdf (retrieved on Aug. 10, 2010).

The reading section 603 detects the code symbol (barcode, QR code) printed on the coupon ticket from the frame image acquired by the photographing control section 601 and reads the discount information from the detected code symbol.

Moreover, if the portable terminal P is detected by the detection section 602, the reading section 603 detects the code symbol (barcode 502, QR code) displayed on the display unit 501 of the portable terminal P from the frame image acquired by the photographing control section 601 and reads the discount information from the detected code symbol.

The image output section 604 outputs the frame images acquired by the photographing control section 601 to the POS terminal 11 via the connection interface 175. The image output section 604 may also sequentially output the frame images acquired by the photographing control section 601 to the POS terminal 11 but, in this embodiment, the frame images of the whole or part of the commodity A detected by the detection section 602 are output to the POS terminal 11. In this way, the frame images of the whole or part of the commodity A detected by the detection section 602 are output to the POS terminal 11, thus preventing the POS terminal 11 from carrying out an object recognition with reference to the PLU file F1 using a frame image in which the commodity A (image of the whole or part of the commodity A) is not contained. By preventing the recognition, in which the frame image containing no commodity A (image of the whole or part of the commodity A) is processed, that is, no possibility of recognizing a specific object is contained, from being executed, the time spent on recognizing a specific object is shortened because the recognition process requires a relatively long time.

Moreover, the image output section 604 outputs the discount information to the POS terminal 11 if the discount information is read by the reading section 603.

With reference to the commodity image contained in the PLU file F1, the object recognition section 605 reads, as a characteristics amount, the surface states (e.g. color in hue or shade, surface roughness, etc.) of the frame image, containing an image of whole or part of the commodity A therein, which is photographed by the photographing section 164 of the commodity reading apparatus 101 to recognize the commodity A as a specific object. In this embodiment, the object recognition section 605 recognizes the commodity A with the generic object recognition method. Moreover, the object recognition section 605 takes no consideration of the outline or size of the commodity A so as to shorten the processing time. Then, in the POS terminal 11, the commodity read by the commodity reading apparatus 101 can be specified from the commodities previously registered in the PLU file F1 according to the recognition result of the object recognition section 605.

The commodity registration section 606 carries out a sales registration by recording the sales registration information associated with the commodity image recognized by the object recognition section 605, that is, the commodity ID, the commodity category, the commodity name and the unit price all of which are of the commodity A specified as the commodity A read by the commodity reading apparatus 101, in a sales master file. Moreover, if the information (e.g. discount rate or amount) read by the reading section 603 is output, the commodity registration section 606 adds the information from the reading section 603 to the sales registration information associated with the commodity image recognized by the object recognition section 605, and records the modified information in the sales master file to carry out a sales registration.

Figure 7:
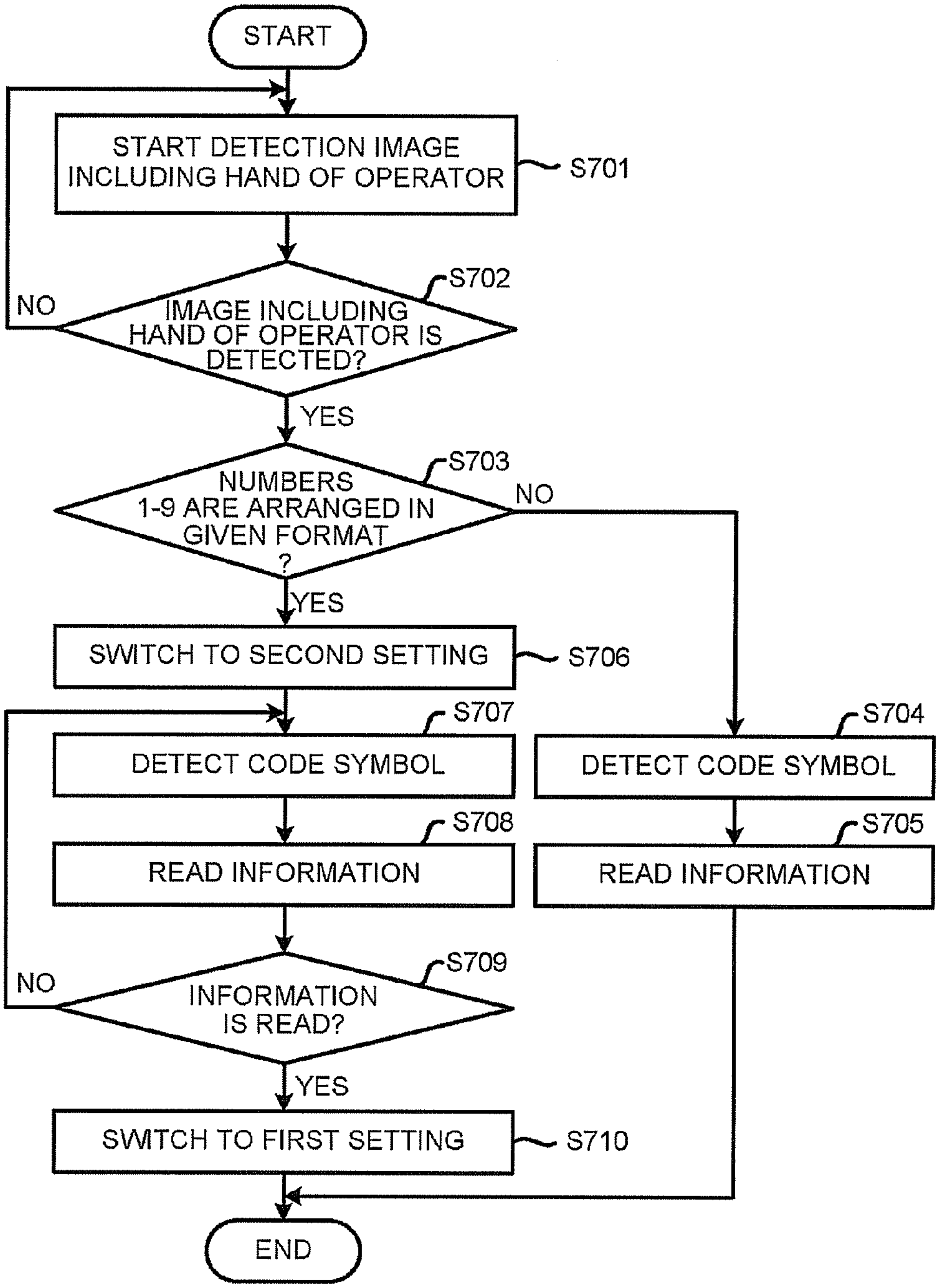
FIG. 7 is a flow chart showing an example of the operations carried out by a commodity reading apparatus according to the present embodiment.

The operation of the commodity reading apparatus 101 is described below in detail. FIG. 7 is a flow chart showing an example of the operation carried out by the commodity reading apparatus according to this embodiment.

The photographing control section 601 sequentially acquires the frame images that are photographed by the photographing section 164 and stored in the RAM 163 after the photographing section 164 starts a photographing operation. The photographing control section 601 switches the setting for controlling the photographing of the photographing section 164 to the first setting when the photographing section 164 starts a photographing operation.

The detection section 602 detects the hand of the operator in the frame image acquired by the photographing control section 601 (Act S701). Moreover, if the hand of the operator in the acquired frame image is not detected (Act S702: No), the detection section 602 returns to Act S701 to detect data in the frame images, repeatedly.

Figure 8:
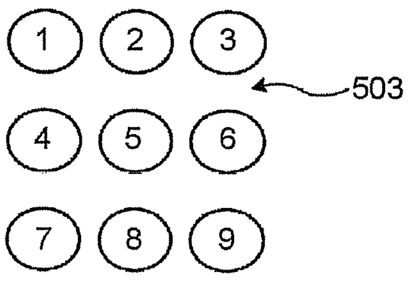
FIG. 8 is a diagram showing the configuration of the numerals 1-9 recognized from a frame image.

On the other hand, if the hand of the operator in the acquired frame image is detected (Act S702: Yes), the detection section 602 recognizes numbers 1-9 from the frame image and determines whether or not the recognized numbers 1-9 are arranged in a given format (Act S703). FIG. 8 is a diagram showing the configuration of the numbers 1-9 recognized from the frame image. As shown in FIG. 8, the detection section 602 determines whether or not the numbers 1-9 recognized from the frame image are arranged in the form of a 3×3 array.

Returning to FIG. 7, if the recognized numbers 1-9 are not arranged in a given format (Act S703: No), the reading section 603 detects the code symbol printed on the coupon ticket from the acquired frame image (Act S704). Next, the reading section 603 reads discount information from the detected code symbol (Act S705). Moreover, although not shown in figures, the image output section 604 outputs the frame image acquired by the photographing control section 601 to the POS terminal 11 via the connection interface 174 if the commodity A is detected in the acquired frame image.

If it is determined that the recognized numbers 1-9 are arrayed in a given format (Act S703: Yes), the photographing control section 601 switches the setting for controlling the photographing of the photographing section 164 from the first setting to the second setting (Act S706). After that, the reading section 603 detects the code symbol displayed on the display unit 501 of the portable terminal P from the frame image acquired by the photographing control section 601 (Act 707) Next, the reading section 603 reads discount information from the detected code symbol (Act S708). The photographing control section 601 determines whether or not information is read by the reading section 603 (Act S709).

If it is determined that information is read by the reading section 603 (Act S709: Yes), the photographing control section 601 switches the second setting to the first setting (Act S710). On the other hand, if it is determined that no information is read by the reading section 603 (Act S709: No), the process returns to Act S707 and the reading of information by the reading section 603 is carried out, repeatedly.

If the discount information is read by the reading section 603, the image output section 604 outputs the read discount information to the POS terminal 11. Moreover, if the frame image is output from the image output section 604, in the POS terminal 11, the object recognition section 605 recognizes, with reference to the commodity image in the PLU file F1, the commodity A from the frame image containing the whole or part of the commodity A photographed by the photographing section 164 of the commodity reading apparatus 101. Then, the commodity registration section 606 adds the information contained in the frame image output from the image output section 604 to the sales registration information associated with the commodity image recognized by the object recognition section 605 and records the modified information in the sales master file to carry out a sales registration.

Thus, in accordance with this embodiment, the commodity reading apparatus 101 comprises: a photographing device 167 for photographing an object to produce a frame image; a reading section 603 for reading information from the image output from the photographing device 167; a detection section 602 for detecting, from the photographed frame image, a portable terminal P having a display unit 501 for displaying the information read by the reading section 603; a photographing control section 601 for controlling the photographing of the photographing device 167 according to a first setting for photographing an object other than the display unit 501 in the case in which no portable terminal P is detected or according to a second setting for photographing the display unit 501 in the case in which the portable terminal P is detected; and a reading section 604 for reading the information displayed on the display unit 501 from the image output from the photographing device 167. Therefore, since the commodity reading apparatus 101 is capable of automatically switching the setting for the frame image photographing of the photographing device 167 from the first setting to the second setting to read the information displayed on the display unit 501 of the portable terminal P, consequentially, there is no need to arrange a dedicated reading device for photographing the image of the display unit 501, and increase in the workload of the operator who operates the POS terminal 11 is avoided.

The programs executed by the POS terminal 11 and the commodity reading apparatus 101 in this embodiment are provided such that such programs are stored in a ROM beforehand.

The programs executed by the POS terminal 11 and the commodity reading apparatus 101 in this embodiment may be stored in a computer-readable recording medium such as CD-ROM, FD (floppy drive), CD-R, DVD (digital versatile disk) as an installable or executable file.

Furthermore, the programs executed by the POS terminal 11 and the commodity reading apparatus 101 in this embodiment may be stored in a computer connected with a network such as the Internet and provided by downloading through the network, or may be provided or distributed through a network such as the Internet.

The programs executed by the POS terminal 11 and the commodity reading apparatus 101 in this embodiment consist of modules including each of the foregoing units (the photographing control section 601, the detection section 602, the reading section 603, the image output section 604, the object recognition section 605 and the commodity registration section 606), however, in view of an actual hardware construction, a CPU reads the programs from the ROM and then executes the programs to load each of the foregoing units on a main memory and realizes the photographing control section 601, the detection section 602, the reading section 603, the image output section 604, the object recognition section 605 and the commodity registration section 606 on the main memory.

Moreover, in this embodiment, the photographing control section 601, the detection section 602 and the reading section 603 are arranged on the commodity reading apparatus 101, however, the present invention is not limited to this, the photographing control section 601, the detection section 602 and the reading section 603 may be arranged on the POS terminal 11, and in this case, the POS terminal serves as a reading system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus, comprising:

a photographing device configured to photograph an object to produce the image of the object;

a reading section configured to read information from the image output from the photographing device;

a detection section configured to detect a portable terminal equipped with a display unit for displaying information read by the reading section from the image output from the photographing device; and a control section configured to control the photographing of the photographing device according to a first setting for photographing an object other than the display unit of the portable terminal if the portable terminal is not detected, or the photographing of the photographing device according to a second setting for photographing the display unit if the portable terminal is detected, wherein the control section is configured to control the photographing of the same photographing device according to the first setting or the second setting based on whether the portable terminal is detected.

2. The reading apparatus according to claim 1, wherein the detection section detects the portable terminal from the photographed image if specific characters are recognized and arranged on the display unit in a given format.

3. The reading apparatus according to claim 1, wherein the detection section detects the portable terminal if the display unit is recognized from the photographed image.

4. The reading apparatus according to claim 1, wherein the control section switches the second setting to the first setting and controls the photographing of the photographing device after information displayed on the display unit is read from the photographed image.

5. The reading apparatus according to claim 1, further comprising:

an illumination section, wherein the control section is configured to set a frame rate of the second setting to be lower than a frame rate of the first setting, and reduces illumination of the illumination section at the second setting smaller than illumination of the illumination section at the first setting.

6. The reading apparatus according to claim 1, wherein the detection section is configured to recognize the portable terminal as the object by reading a surface state of the object as a characteristic amount from the produced image, and the surface state includes at least one of color condition of the object and surface roughness of the object.

7. A reading system, comprising:

a photographing device configured to photograph an object to produce the image of the object;

a reading section configured to read information from the image output from the photographing device;

a detection section configured to detect a portable terminal equipped with a display unit for displaying information read by the reading section from the image output from the photographing device; and a control section configured to control the photographing of the photographing device according to a first setting for photographing an object other than the display unit of the portable terminal if the portable terminal is not detected, or the photographing of the photographing device according to a second setting for photographing the display unit if the portable terminal is detected, wherein the control section is configured to control the photographing of the same photographing device according to the first setting or the second setting based on whether the portable terminal is detected.

8. A reading method, which is performed by a reading apparatus including a photographing section and a reading section, comprising:

detecting a portable terminal equipped with a display unit for displaying information read by the reading section from an image output from the photographing section; and controlling the photographing of the photographing section according to a first setting for photographing an object other than the display unit of the portable terminal if the portable terminal is not detected, or the photographing of the photographing section according to a second setting for photographing the display unit if the portable terminal is detected, wherein the controlling of the photographing of the same photographing section is according to the first setting or the second setting based on whether the portable terminal is detected.

* * * * *